US010284588B2

(12) United States Patent
Solow et al.

(10) Patent No.: US 10,284,588 B2
(45) Date of Patent: May 7, 2019

(54) DYNAMIC SELECTION OF SECURITY POSTURE FOR DEVICES IN A NETWORK USING RISK SCORING

(71) Applicant: Cisco Technology, Inc., San Jose, CA (US)

(72) Inventors: Hillel Solow, Beit Shemesh (IL); Ezra Darshan, Beit Shemesh (IL); Harel Cain, Jerusalem (IL); Steve Epstein, Hashmonaim (IL); Arnold Zucker, Hashmonaim (IL)

(73) Assignee: Cisco Technology, Inc., San Jose, CA (US)

( * ) Notice: Subject to any disclaimer, the term of this patent is extended or adjusted under 35 U.S.C. 154(b) by 256 days.

(21) Appl. No.: 15/276,808

(22) Filed: Sep. 27, 2016

(65) Prior Publication Data
US 2018/0091540 A1 Mar. 29, 2018

(51) Int. Cl.
G06F 21/57 (2013.01)
H04L 29/06 (2006.01)
G06F 21/00 (2013.01)

(52) U.S. Cl.
CPC ...... *H04L 63/1433* (2013.01); *H04L 63/0227* (2013.01); *H04L 63/1425* (2013.01); *H04L 63/1441* (2013.01)

(58) Field of Classification Search
CPC ............. H04L 63/1433; H04L 63/0227; H04L 63/1425; H04L 63/1441
USPC ......................................................... 726/25
See application file for complete search history.

(56) References Cited

U.S. PATENT DOCUMENTS

| 7,096,502 | B1 | 8/2006 | Fox et al. |
| 8,997,201 | B2 | 3/2015 | Wotring |
| 9,438,626 | B1* | 9/2016 | Zilberberg .............. H04L 63/20 726/23 |
| 9,578,055 | B1* | 2/2017 | Khanal ............... H04L 63/1458 726/23 |
| 2015/0145643 | A1 | 5/2015 | Fadell et al. |
| 2015/0242619 | A1 | 8/2015 | Bender et al. |
| 2015/0244681 | A1* | 8/2015 | Blumenfeld ........ H04L 63/0421 713/168 |

(Continued)

OTHER PUBLICATIONS

"Cisco Security Posture Assessmemt Service" in At-A-Glance; Cisco Systems 2015.

(Continued)

*Primary Examiner* — Haresh N Patel
(74) *Attorney, Agent, or Firm* — Behmke Innovation Group LLC; James Behmke; Stephen D. LeBarron

(57) ABSTRACT

In one embodiment, a method for assessing security posture for entities in a computing network is implemented on a computing device and includes: receiving behavior data from one or more of the entities, where the behavior data is associated with at least activity on the computing network by the one or more entities, calculating a risk score for at least one of the entities by comparing the behavior data with a classification model, where the classification model represents at least a baseline for normative network behavior by the entities in a computing network, assessing a security posture for the at least one the entities based on the risk score, and allocating network security resources to the at least one of the entities at least in accordance with the security posture.

18 Claims, 2 Drawing Sheets

(56) References Cited

U.S. PATENT DOCUMENTS

| | | | | |
|---|---|---|---|---|
| 2015/0381637 A1* | 12/2015 | Raff | H04L 63/0218 | 726/23 |
| 2016/0065601 A1* | 3/2016 | Gong | G06F 21/561 | |
| 2016/0247175 A1* | 8/2016 | Milton | H04W 4/029 | 726/23 |
| 2016/0255104 A1* | 9/2016 | Eslambolchi | H04L 63/1416 | 726/23 |
| 2016/0323318 A1* | 11/2016 | Terrill | H04L 63/20 | 726/23 |
| 2016/0357967 A1* | 12/2016 | Mulchandani | G06F 21/57 | 726/23 |
| 2017/0013524 A1* | 1/2017 | Ho | H04W 36/08 | 726/23 |
| 2017/0026391 A1* | 1/2017 | Abu-Nimeh | H04L 63/1416 | 726/23 |
| 2017/0237764 A1* | 8/2017 | Rasumov | G06Q 10/0635 | 726/25 |
| 2017/0279825 A1* | 9/2017 | Bower, III | H04L 63/1425 | 726/23 |
| 2017/0331847 A1* | 11/2017 | Alexander | H04L 63/1433 | 726/23 |
| 2018/0027006 A1* | 1/2018 | Zimmermann | H04L 63/0245 | 726/11 |
| 2018/0069889 A1* | 3/2018 | Beale | H04L 63/1433 | 726/23 |

OTHER PUBLICATIONS

Lundquist, Doug et al; "Ontology-Driven Cyber-Security Threat Asessment Based on Sentiment Analysis of Network Activity Data"; in Cloud and Autonomic Computing (ICCAC), 2014 International Conference on Sep. 8-12, 2014.

National Security Agency—Systems and Network Analysis Center, released Aug. 20, 2010; "A Framework for Assessing and Improving the Security Posture of Industrial Control Systems (ICS)".

"OWASP Risk rating Methodology", available on the web at: https://www.owasp.org/index.php/OWASP_Risk_Rating_Methodology; Sep. 3, 2015.

Teoh, Chu Chong et al; "A neural network approach towards reinforcing smart home security", in Information and Telecommunication Technologies (APSITT), 2010 8th Asia-Pacific Symposium, pp. 1,5. Jun. 15-18, 2010.

* cited by examiner

DYNAMIC SELECTION OF SECURITY POSTURE FOR DEVICES IN A NETWORK USING RISK SCORING

FIELD OF THE INVENTION

The present invention generally relates to scoring risks associated with networked systems.

BACKGROUND OF THE INVENTION

Network computing models have continued to evolve and grow increasingly more complex. With such increased complexity has come increased exposure to random and/or systemic failures of computer networks and/or their component devices due to either intentionally malicious attacks or combinations of unforeseen circumstances.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for assessing security posture for entities in a computing network is implemented on a computing device and includes: receiving behavior data from one or more of the entities, where the behavior data is associated with at least activity on the computing network by the one or more entities, calculating a risk score for at least one of the entities by comparing the behavior data with a classification model, where the classification model represents at least a baseline for normative network behavior by the entities in a computing, network, assessing a security posture for the at least one the entities based on the risk score, and allocating network security resources to the at least one of the entities at least in accordance with the security posture.

Description

Cyber security protection often entails the allocation of resources to combat or deter an attack. By way of example, cyber security may require allocation of digital resources such as bandwidth to send suspicious traffic for analysis, processing resources both in the fog and in the cloud to analyze traffic and events, and memory resources to buffer data for analysis in bulk. Human resources may also be allocated to cyber security, and it will be appreciated that such resources are typically costly. It will further be appreciated that the availability of these resources is finite, and accordingly their optimal allocation is critical for attaining the most effective cost/performance tradeoff.

It will also be appreciated that the implementation of cyber security typically impacts the availability and/or timeliness of services in a given network, in some cases effectively hindering or preventing the delivery of data or services, in other cases at least introducing delays in such delivery. It will therefore be appreciated that the application of unnecessarily restricting cyber security protection, i.e., in instances where the cost/performance tradeoff may not justify the use of resources required for an applied level of security, may actually have a negative effect on the quality or availability of network services. Accordingly, network operators generally endeavor to allocate the cyber security protection resources to points in the network that pose the greatest risk to continued operations.

Figure 1:
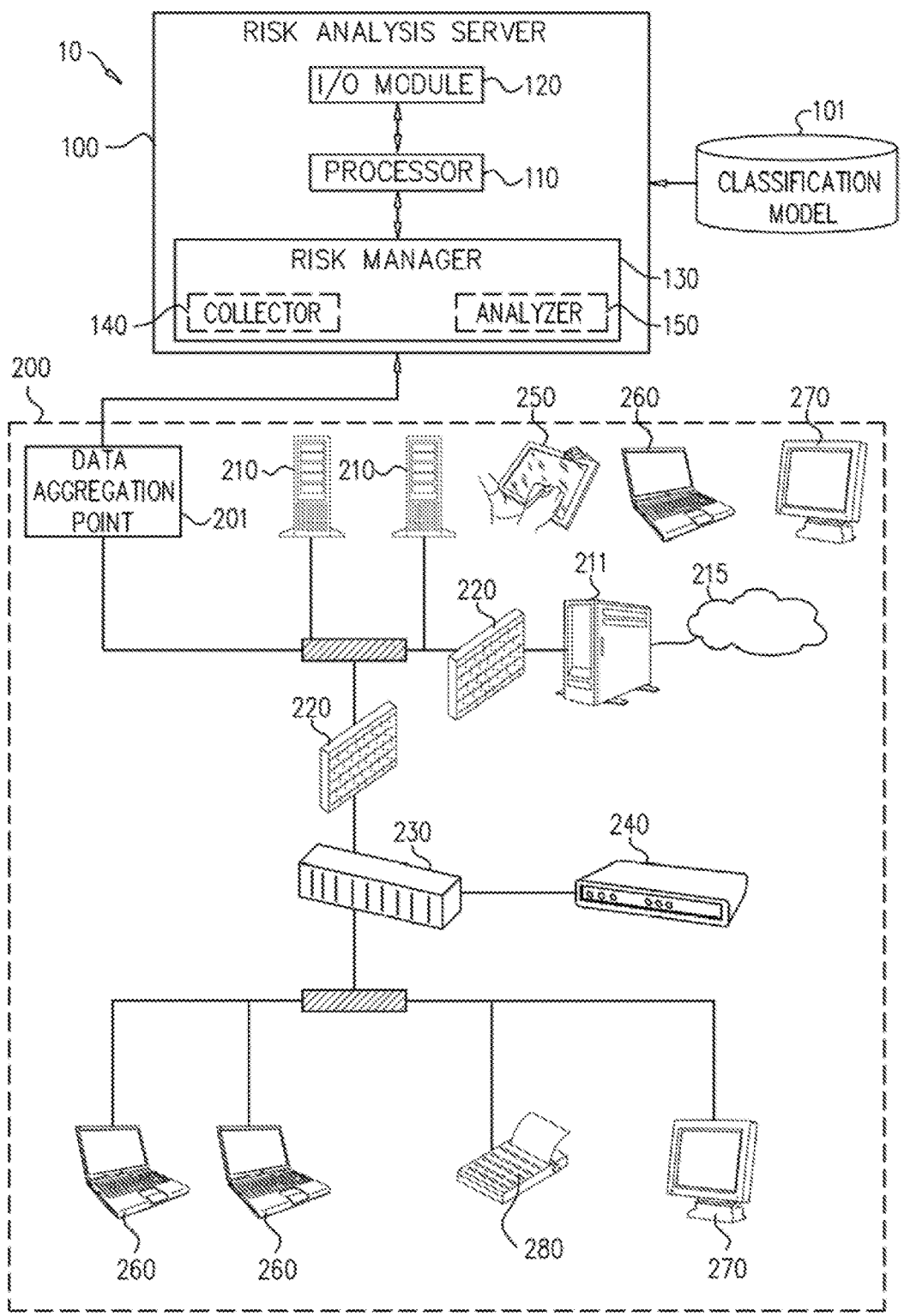
FIG. 1 is a partly pictorial illustration of an exemplary security posture scoring system, constructed and operative in accordance with embodiments described herein.

Reference is now made to FIG. 1, which illustrates an exemplary security posture scoring system 10, constructed and operative in accordance with embodiments described herein. System 10 comprises risk analysis server 100 and network 200. As will be described further hereinbelow, risk analysis server 100 is operative to generate a risk score for network 200, its component devices (nodes), and/or sub-nets. This risk score may then be used to calibrate the allocation of cyber security protection resources in order to mitigate perceived risk as indicated by the risk score(s). It will be appreciated that in operation system 10 may comprise more than one risk analysis server 100, each of which may be configured to provide services to more than one network 200.

Network 200 comprises network servers 210, VPN server 211, firewalls 220, switch 230, intrusion protection system/intrusion detection system (IPS/IDS) 240, computer tablet 250, computer laptops 260, personal computers 270, and printer 280. Devices such as computer tablet 250, computer laptops 260, and personal computers 270 may access VPN server 211 via communications network 215. Communications network 215 may be any suitable network such as, for example, a WiFi network, a mobile communications network, the Internet, etc. It will be appreciated that the depiction of the individual components of network 200 is exemplary; the embodiments described herein are not limited to a specific configuration of network 200. In accordance with embodiments described herein, the components of network 200 may be configured with a risk collection agent (not shown) that may be configured to collect ongoing behavior data from the entities of network 200, i.e., its devices, systems, sub-nets, etc. This behavior data is then forwarded through network 200 to data aggregation point 201. Data aggregation point 201 may be implemented on any suitable device that may communicate either directly or indirectly with risk analysis server 100, such as, for example, a router, network gateway, or computer. It will be appreciated that there may be a one-to-many ratio between risk analysis server 100 and network 200, i.e., server 100 may support multiple networks 200. Accordingly, data aggregation point 201 may be employed to provide server 100 with the relevant data from a given network 200 across network components, such as servers and endpoints.

In accordance with some embodiments described herein, the functionality of data aggregation point 201 may be incorporated into risk analysis server 100. In accordance with the exemplary embodiment of FIG. 1, each of the components of network 200 (i.e., network servers 210, VPN server 211, firewalls 220, switch 230, IPS/IDS 240, computer tablet 250, computer laptops 260, personal computers 270, and printer 280) is configured with a risk collection agent. However, it will be appreciated that the extent to which all of the components of a given network 200 are so configured may be a function of, for example, the complexity of network 200 and/or a level of risk analysis desired for network 200. Similarly, in operation network 200 may also be configured with more than one data aggregation point 201, depending on the configuration of network 200.

Risk analysis server 100 may be implemented on any suitable computing device and comprises processor 110, I/O module 120 and risk manager 130. In some embodiments of the present invention, the functionalities of some or all of the components of risk analysis server 100 may be distributed in separate units or modules. For example, some or all of the components of risk analysis server 100 may be cloud-based and accessible via a communications network such as, for example, a LAN, WAN or the Internet.

Risk analysis server 100 comprises hardware and software components, such as are well-known in the art. I/O module 120 may be any suitable software or hardware component such as a transceiver or network card that may be operative to use standards such as are known in the art to communicate at least with data aggregation point 201. It will be appreciated that risk analysis server 100 may comprise more than one processor 110. For example, one such processor 440 may be a special purpose processor operative to at least execute risk manager 130.

Risk manager 130 may be a software application that may be executed by processor 110 in order to at least collect and analyze behavior data to be received from data aggregation point 201. Alternatively, risk manager 130 may be implemented as a hardware component. Risk manager 130 comprises collector 140 and analyzer 150. Collector 140 a module or service operative to collect the behavior data from data aggregation point 201 via I/O module. Analyzer 150 is a module or service operative to analyze the received behavior data and calculate a risk score for network 200 and/or its components. It will be appreciated that the depiction of collector 140 and analyzer 150 as separate modules represents an exemplary implementation of their associated functionalities. In practice, the functionalities of collector 140 and analyzer 150 may be integrated into a single module.

In accordance with embodiments described herein, the behavior data collected by collector 140 from the risk collection agents may represent connectivity and/or activity by some or all of the entities of network 200, for example:
Network layout and topology.
Which devices, sub-nets, and/or systems communicate with each other, as well as which protocols are used for such communication.
Which devices, sub-nets, and/or systems communicate with specific cloud services.
Traffic flow patterns, such as for example, volume, direction and timing of traffic between two or more devices.
Applications that are used by devices, on network 200 (this may, for example, be ascertained by analyzing network traffic and/or by endpoint security systems that report application use).
Application-specific events or data that are visible from the network
Files, file-types, and/or file sizes that are uploaded or downloaded by the devices in network 200.

In accordance with embodiments described herein, the behavior data may be collected according to different levels of aggregation. For example, depending on the configuration of system 10, the behavior data may be collected on a granular level according to each device in network 200. It will, however, be appreciated that it may be impractical or not feasible to implement a risk collection agent in each device in network 200. Accordingly, the collected behavior data may be, to at least some degree, aggregated without particular association to each specific device in network 200. For example, behavior data for devices connecting to network 200 via VPN server 211 may be aggregated. The behavior data may or may not include an indication of the number and/or types of the devices connecting through VPN server 211, but not necessarily a breakdown according to each specific device. Behavior data collected from "the other side" of a firewall may be similarly aggregated. It will be appreciated that at the time that system 10 is implemented, the level of aggregation for each device and/or sub-net may be determined as a function of the cost and feasibility of the implementation. It will similarly be appreciated that in some implementations behavior data may not be collected at all for one or more of the component devices and/or sub-nets of network 200.

Analyzer 150 is operative to analyze the received behavior data in order to calculate a risk score for a given device, subnet, or network. The risk scores may then be used in a cyber security protection resource allocation process, either autonomously by risk manager 130, and/or manually by network administrators (e.g., the administrator of network 200). For example, the risk scores may be used to determine where to send auditors based on which network segments pose the greatest risk, or how to modify the thresholds and/or configurations of security appliances such as firewalls 220, and IDS/IPS 240. Network access to nodes that are considered too likely to be compromised may be denied or limited based on the nodes' risk scores. Similarly, certain applications may be restricted from running on such devices.

It will be appreciated that system 10 may also be implemented to assess security posture for the client devices serviced by an Internet service provider (ISP) who provides home connectivity and security to potentially millions of end users. The risk scores may be used by risk manager 130 and/or a human operator to categorize the homes serviced by the ISP according to, for example, low, medium, high and very high risk. The provision of service and/or the security precautions implemented for a given home may be a function of its associated risk category. For example, a home with a very, high risk score may be flagged to proactively receive an onsite visit by an IT professional. A home with a high risk score may receive a phone call or email from the IT department. A home with a medium risk may have its cloud and fog security scrutiny set to maximum. A home with a low risk score may operate under normal security conditions.

In accordance with embodiments described herein, analyzer 50 is configured to use classification model 101 when analyzing the behavior data received from network 200. Classification model 101 provides a baseline for normative or non-normative behavior by the entities, i.e., components of network 200. For example, a baseline for non-normative behavior may be generated via a machine learning process using behavior data associated with devices/systems known to be compromised (e.g., hacked, infected with a virus, and/or functionally unsatisfactory for whatever reason). Any suitable method may be employed to identify compromised systems. For example, system administrators may become aware of a compromised system by any suitable means, e.g., during a regular audit, some compromise could be discovered; an anti-virus system might catch an infected system; users may report anomalous behavior; etc. Once a specific device/system is known to be in a compromised state, the machine learning process may classify that system's behavior as "BAD" and use that to train classification model 101. Classification model 101 may be employed for use in the classification of other devices/systems according to how closely their behavior resembles devices/systems known to be compromised.

Classification model 101 is also operative to classify a device/system according to how closely its behavior resembles devices/systems known or assumed to be in a non-compromised state. For example, some devices/systems may be certified by a security audit as being non-compromised. It will be appreciated that in some cases, there may not be any devices/systems that are reliably known to be in either a compromised, or non-compromised, state. In accordance with embodiments described herein, in such a case it may be assumed that the vast majority (i.e., a given percentage) of devices/systems in a large population the client devices served by an ISP, or a segment thereof) are not compromised. Based on this assumption, outlier device/systems may be detected whose statistical profile deviates significantly from the learned baseline of presumably "GOOD" systems. In such a case, a system's risk score may be computed by measuring its (dis)similarity to assumed GOOD systems.

Training data for classification model 101 may be collected across a relatively long, period of time (e.g., a month) from a large collection of devices. For example, if system 10 is associated with an ISP, behavior data may be collected from hundreds of individual households or sites. Similarly, if system 10 is associated with an enterprise network, the behavior data may be collected from the various nodes of the enterprise network. It will be appreciated that enterprise networks are also typically associated with an ISP, such that for an ISP the training data may be associated both with individual households and enterprise networks.

Once collected, the training data may then be labeled by security professionals to assign risk scores for the devices/systems in the training population, as described hereinabove. Additional information, not included in the observed behavior data may be included in a data enrichment process. For example, demographic information and/or information received from the home owners may be used to label the training data. The labeled training data represents a labeled training set, as is commonly used in supervised learning techniques.

The labeled training set is input into the machine learning process to train, calibrate, and cross-validate classification model 101, which may then be used to classify new data from additional devices/systems and assign them risk scores. It will be appreciated that the embodiments described herein are not limited to a specific machine learning algorithm. Any suitable machine learning algorithm for supervised classification may be used, for example, logistic regression, KNN, SVM, random forests, decision trees, etc. In accordance with embodiments described herein, different algorithms may be tried and compared against each other as is known in the art, for example by use of ROC curves and measuring the Area Under Curve of the algorithms tried. The specific algorithm to use may be chosen according to one or more factors, such as, for example, the algorithm's resistance to overfitting, its capability to cope with the size and dimensions of the selected feature set after all possible reductions, its performance versus other algorithms, the level of interpretability it offers, the size of the resulting model, and/or other possible considerations.

The risk score calculations performed by analyzer 150 may be weighted to take into account sensitivity to risk, i.e., the security requirements of the device/system as per a defined default per device/system characteristics or as defined explicitly by an authorized supervisor. For example, a network with high security requirements (e.g., a bank transaction system) might then therefore trigger strong responses to a medium or even low risk score. In comparison, a network or site with lower security requirements (e.g., a home user) might trigger relatively less urgent responses to a similar score.

In accordance with embodiments described herein, once calculated, the risk scores may be used to calculate the likelihood that a particular system may be hacked in the future (i.e., that the system has high exposure to being hacked), and/or that the particular system may have already been hacked (i.e., that the score indicates that the system is behaving in a manner consistent with having already been hacked).

It will be appreciated that in a case where a particular system has been determined to have been backed, it may be useful to determine, to the extent possible, when the hack occurred. System 10 may be configured to aggregate historical behavior data for a certain duration of time. It may therefore be possible to estimate the point in time when the hacked system was hacked by employing a time-based analysis of the historical behavior data. Alternatively, or in addition, the timing of the hack may be known by external methods (e.g. by observation, or manual inspection of time stamps, activity logs, etc.).

Once the point in time has been estimated, it may then be possible to use behavior data from after the point in time to retrain classification model 101 to improve classification of an already hacked system. Similarly, the system behavior immediately prior to the point in time may be indicative of a system that is susceptible to attack. Accordingly, behavior data from before the point in time may be used to retrain classification model 101 to improve classification of susceptibility to attack. In either case, the risk score may be used to determine how to best respond in order to effectively allocate resources where they are most needed.

In accordance with embodiments described herein, the risk scores may be sub-divided to address various categories of risk, such as, risk of a specific type of attack, and/or risk which could likely be mitigated by a specific protection. For example, once a system has been classified as hacked/bad, it may be possible, using data analysis or using external sources, to classify which type of attack occurred. Once the type of attack has been determined, system 10 may learn which behaviors are indicative of this sort of attack (which, as described hereinabove, may address susceptibility to attack, or an already successful attack). The behavior data associated with the attack (or multiple such attacks) may be labeled to produce a labeled training set, as described hereinabove. Any suitable machine learning algorithm for supervised classification may be used (as described hereinabove) to learn which behaviors are indicative of the specific type of attack.

Figure 2:
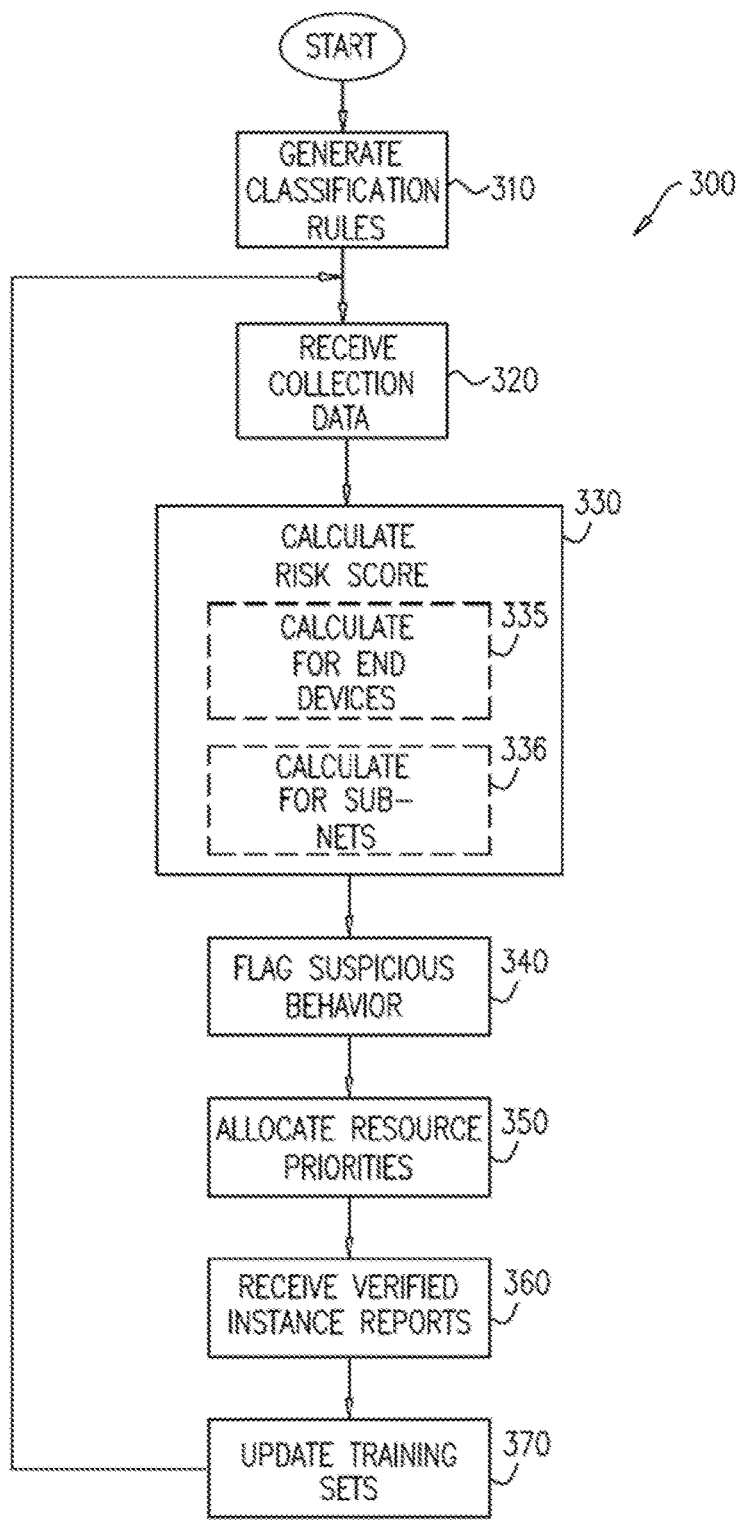
FIG. 2 is a flow chart of a security posture scoring process to be performed by the system of FIG. 1.

Reference is now made to FIG. 2 which is a flow chart of a security posture scoring process 300 to be performed by system 10. As described hereinabove, one or more supervised learning techniques are used to generate (step 310) classification model 101 (FIG. 1) for security posture scoring. It will be appreciated that step 110 may be performed as an initial, one-time setup step. However, in accordance with some embodiments described herein, step 310 may be performed periodically, for example, to reinitialize or recalibrate classification model 101.

In accordance with some embodiments described herein, the training sets used for the generation (step 310) of classification model 101 are not limited to behavior data from network 200 (FIG. 1). System 10 may use training sets derived from multiple networks in step 310. Furthermore, classification model 101 may be applied to systems other than network 200. Accordingly, process 100 may also be implemented in accordance with a cloud-based model that may benefit from the increased diversity of training sets from different systems.

Collector 140 may receive (step 320) risk collection data (i.e., behavior data) from one or more data aggregation points 201 via I/O module 120. It will be appreciated that depending on the configuration of system 10, collector 140 may be configured to actively pull behavior data from data aggregation points 201 and/or to passively receive behavior data that is pushed by data aggregation points 201. It will similarly be appreciated that data aggregation point(s) 201 may be implemented as any suitable device or system in network 200. For example, one or more network servers 210 may also be configured as a data aggregation point 201. Other devices such as VPN server 211, firewalls 220, switch 230, IPS/IDS 240, computer tablet 250, computer laptops 260, personal computers 270, and printer 280 may also be similarly configured. It will furthermore be appreciated that in some cases, system 10 may also be implemented in communication with sites serviced by an ISP. In such cases, collector 140 may also be configured to receive behavior data directly from an individual computing device without aggregation.

It will be appreciated that collector 140 may be operative to receive a wide variety of behavior data from data aggregation points 201. In accordance with embodiments described herein, such behavior data may include qualitative data regarding the traffic observed through the data link, network and/or transport levels of network 200. For example, such qualitative data may include some or all of:

Volume of incoming and outgoing traffic for a given time window, which may also be totaled and for itemized per device.

Volume of traffic (for a given time window) by protocol and/or port number, which may also be totaled and/or itemized per device.

Volume of traffic (for a given time window) by TCP or UDP, which may also be totaled and/or itemized per device.

MAC addresses of devices currently (in a given time window) present in the local network under the assumption of 1:1 mapping between MAC addresses and devices. Such behavior data may be useful to determine the physical presence (or lack of, thereof) of users at a network site. For example, the presence of smartphones in a network is indicative of the physical presence of their associated users.

Geolocation of external IP addresses with which traffic is being exchanged.

It will be appreciated that system 10 may be configured to vary the given time windows from days of week, hours of day etc., in order to learn behavior patterns for different time frames. It will also be appreciated that the list of qualitative data disclosed hereinabove is not limiting; in accordance with embodiments described herein, other qualitative data may be collected through some measure of inspection of application level headers and/or payload.

Analyzer 150 may use the collected behavior data to calculate (step 330) risk scores. As noted hereinabove, the risk scores may be calculated for different levels of aggregated data, (e.g., individual devices, systems, sub-nets, networks, etc.). Accordingly, it will be appreciated that step 330 may comprise multiple sub-steps for the calculation of different levels of aggregation. For example, analyzer 150 may calculate (step 335) risk scores for end devices, and calculate (step 336) risk scores for sub-nets separately.

Based on a given risk score, risk analysis server 100 may flag (step 340) suspicious behavior for a device, system, sub-net or network associated with the given risk score. In accordance with embodiments described herein, classification model 101 may be implemented to provide an indication of a confidence level when performing step 340. Specifically, risk scores may not necessarily be interpreted in a binary manner, i.e., either "good" or "bad". Classification model 101 may facilitate a higher degree of granularity is assessing risk posture. For example, a given device/system may be determined to be "vulnerable" or "highly vulnerable" to attack; or "unlikely", "likely", or "very likely" to have already been comprised by an attack.

Risk analysis server 100 may allocate (350) resource priorities in view of the calculated risk scores and/or flagged behavior. It will be appreciated that the actions governed by such resource priorities may include:

Allocation of ongoing resources (i.e., resources allocated proactively to prevent, or defend against, attacks), such as, for example, implementing a firewall, or implementing rights restrictions for certain sensitive resources.

Designation of response resources (i.e. determination of which resources are to be used in the future if, and when, necessary in response to an attack on a given device or system), such as backup hardware, sniffer utilities, or human resources.

Release of resources in response to a perceived attack (i.e., identifying and/or assigning resources from among available resources).

It will be appreciated that the resources available to the operator of system 10 are limited; even if a device/system my be nominally entitled to a given resource allocation, it may not be feasible given the finite nature of the resources available. Accordingly, step 350 may comprise an iterative process whereby allocation of ongoing resources, designation of response resources and actual release of response resources may be refined in light of the actual availability of such resources.

It will further be appreciated that the designation of resources for future use may not be limited, per se, by the finite resources available. Such resources may be over-allocated under the assumption that at any given time only a certain percentage of entities in network 200 may be compromised and therefore in need of response resources. For example, in light of physically available resources, system 10 may be capable of supporting a given number of simultaneous "truck rolls." However, under the assumption that not all of the devices/systems that are designated for a truck roll response will require such a response at the same time, the designation of resources for future use may provide for a truck roll response (if and when needed) to more than the given number that may be provided at any one time.

Depending on the configuration of system 10, risk analysis server 100 may also receive (step 360) verified instance reports regarding successful attacks and/or confirmation of false positive findings (i.e., where suspicious behavior detected in step 340 was actually not associated with a compromised device/system). Such reports may be based on manual detection/inspection of the relevant devices/systems, logs from IPS/IDS 240, automated tools such as anti-virus and anti-spyware utilities, etc.

Risk analysis server 100 may be configured to use the verified instance reports from step 360 to update (step 370) (or replace) the training sets used in step 310 to generate classification model 101. As noted hereinabove, step 310 may be performed on a periodic basis to update classification model 101.

It will be appreciated that process 300 is not limited to the performance of steps 340, 350 and 360 in a specific linear order; the order of their presentation in FIG. 2 is exemplary. It will further be appreciated that some of the functionality described with respect to risk analysis server 200 may be augmented and/or replaced by manual input or procedures. For example, some or all of step 350 may alternatively be performed manually.

It will be appreciated that the embodiments described herein may provide an autonomous approach to dynamic security resource allocation. By using machine learning statistical modeling techniques to classify the risk score of a network entity, the assignment of protection resources may be improved by placing more security resources in the places they are most needed. It will be appreciated that this may be particularly useful for network environments where the available computing and human resources may be insufficient to mitigate every possible security risk, and accordingly the finite resources are to be allocated in as optimal a manner as possible.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for assessing security posture for entities in a computing network, the method implemented on a computing device and comprising:
    receiving, at a device in a computer network, behavior data from one or more of said entities, wherein said behavior data is associated with at least activity on said computing network by said one or more entities;
    calculating, by the device, a risk score for at least one of said entities by comparing said behavior data with a classification model, wherein said classification model represent at least a baseline for normative network behavior by said entities in a computing network;
    based on the calculated risk score, selecting, by the device, a security posture from a plurality of security postures for said at least one of said entities, wherein said security posture represents at least a measure of susceptibility to attack;
    allocating, by the device, network security resources to said at least one of said entities at least in accordance with said selected security posture; and
    preventing an attack on said at least one of said entities based on the allocated network resources.

2. The method according to claim 1 and further comprising:
    generating said classification model using machine learning techniques to analyze training sets representing previous network activity.

3. The method according to claim 2 wherein said generating comprises:
    determining that given entities in a computing network are compromised entities, wherein said security for said compromised entities has been breached; and
    analyzing previous network activity for said compromised entities.

4. The method according to claim 3 and wherein said analyzing further comprises:
    determining a point in time when said security for said compromised entities was breached.

5. The method according to claim 4 and wherein said generating further comprises:
    classifying at least some of said previous network activity that occurred before said point in time as indicative of susceptibility to attack; and
    classifying at least some of said previous network activity that occurred subsequent to said point in time as indicative of susceptibility to attack.

6. The method according to claim 2 wherein said generating comprises:
    determining that given entities in a computing network are non-compromised entities, wherein said security for said non-compromised entities has not been breached; and
    analyzing previous network activity for said non-compromised entities.

7. The method according to claim 2 wherein said generating comprises:
    assuming that most entities in said computing network are non-compromised entities, wherein said security for said non-compromised entities has not been breached; and
    analyzing previous network activity for a representative sample of said non-compromised entities.

8. The method according to claim 1 and wherein said computing network is at least one enterprise network.

9. The method according to claim 1 and wherein said computing network comprises a multiplicity of home user computing systems.

10. The method according to claim 1 and wherein said allocating comprises:
    allocating said network security resources to respond to a future attack on said at least one of said entities.

11. The method according to claim 1 and wherein said allocating comprises:
    allocating said network security resources to respond to a detected attack on said at least one of said entities.

12. The method according to claim 1 and further comprising:
    based on said risk score, determining that security for said at least one of said entities has been breached.

13. The method according to claim 1 and further comprising:
    receiving at least one verified instance report of an attack on at least one of said entities in a computing network; and
    retraining said classification model in accordance with said verified instance reports.

14. The method according to claim 1 and wherein said receiving comprises receiving aggregated behavior data associated with said behavior data associated with more than one of said entities.

15. The method according to claim 1 and wherein said at least one of said entities is an individual device.

16. The method according to claim 1 and wherein said at least one of said entities is a multi-device entity associated with more than one device in said computing network, and said calculating comprises calculating said risk score for said multi-device entity.

17. A security posture scoring system implemented on a computing device and comprising:
   an I/O module operative to at least receive behavior data from one or more entities n a computer network, wherein said behavior data is associated with at least activity on said computing network by said one or more entities;
   a processor;
   a risk manager application to be executed by said processor and operative to:
   calculate a risk score for at least one of said entities by comparing said behavior data with a classification model, wherein said classification model represents at least a baseline for normative network behavior by said entities in said computing network,
   based on the calculated risk score, select a security posture from a plurality of security postures for said at least one said entities, wherein said security posture represents at least a measure of susceptibility to attack,
   allocate network security resources to said at least one of said entities at least in accordance with said security posture; and
   prevent an attack on said at least one of said entities based on the allocated network resources.

18. A security posture assessment system, implemented on a computing device and comprising:
   means for receiving behavior data from one or more entities, wherein said behavior data is associated with at least activity on said computing network by said one or more entities;
   means for calculating a risk score for at least one of said entities by comparing said behavior data with a classification model, wherein said classification model represents at least a baseline for normative network behavior by said entities in a computing network;
   means for selecting a security posture from a plurality of security postures for said at least one said entities based on said risk score, wherein said security posture represents at least a measure of susceptibility to attack;
   means for allocating network security resources to said at least one of said entities at least in accordance with said selected security posture; and
   prevent an attack on said at least one of said entities based on the allocated network resources.

* * * * *

UNITED STATES PATENT AND TRADEMARK OFFICE
CERTIFICATE OF CORRECTION

PATENT NO. : 10,284,588 B2
APPLICATION NO. : 15/276808
DATED : May 7, 2019
INVENTOR(S) : Hillel Solow et al.

It is certified that error appears in the above-identified patent and that said Letters Patent is hereby corrected as shown below:

In the Specification

In Column 3, Line 14, please amend as shown:
cessor 110 may be a special purpose processor operative to In Column 4, Line 41, please amend as shown:
lyzer 150 is configured to use classification model 101 when In Column 6, Line 8, please amend as shown:
system has been determined to have been hacked, it may be In Column 6, Line 51, please amend as shown:
ing. It will be appreciated that step 310 may be performed as In Column 6, Line 62, please amend as shown:
than network 200. Accordingly, process 300 may also be In Column 8, Line 27, please amend as shown:
may be nominally entitled to a given resource allocation, it In Column 9, Line 32, please amend as shown:
a single embodiment may also be provided separately or in any In the Claims In Column 11, Line 7, please amend as shown:
From one or more entities in a computer network, Signed and Sealed this
Twenty-eighth Day of July, 2020

Andrei Iancu
*Director of the United States Patent and Trademark Office*